(12) United States Patent
Fleming

(10) Patent No.: US 11,981,839 B2
(45) Date of Patent: *May 14, 2024

(54) METHOD AND APPARATUS FOR FABRICATION OF COMPOSITE TOOLING

(71) Applicant: The Boeing Company, Chicago, IL (US)

(72) Inventor: Michael J. Fleming, Ladson, SC (US)

(73) Assignee: The Boeing Company, Chicago, IL (US)

( * ) Notice: Subject to any disclaimer, the term of this patent is extended or adjusted under 35 U.S.C. 154(b) by 1211 days.

This patent is subject to a terminal disclaimer.

(21) Appl. No.: 16/588,641

(22) Filed: Sep. 30, 2019

(65) Prior Publication Data

US 2021/0095162 A1 Apr. 1, 2021

(51) Int. Cl.
*C09J 5/02* (2006.01)
*B64F 5/10* (2017.01)
*C09J 5/06* (2006.01)

(52) U.S. Cl.
CPC .............. *C09J 5/02* (2013.01); *B64F 5/10* (2017.01); *C09J 5/06* (2013.01); *C09J 2301/504* (2020.08); *C09J 2463/00* (2013.01)

(58) Field of Classification Search
CPC ....... B64F 5/10; B29C 33/3842; B29C 33/68; B29C 2033/385; B29C 65/50; B29C 65/4825; B29C 66/721; B29C 70/443; B29C 70/345; B29C 70/46; B29C 70/462; B29C 70/549; B29C 2043/3655; B29L 2031/3076; B29L 2031/757; C09J 5/02; C09J 5/06; C09J 2301/504; C09J 2463/00; Y10T 156/1092

See application file for complete search history.

(56) References Cited

U.S. PATENT DOCUMENTS

| | | | |
|---|---|---|---|
| 4,228,062 A | * | 10/1980 | Lee, Jr. .................. C09J 4/06 525/445 |
| 4,445,951 A | | 5/1984 | Lind et al. |
| 5,106,568 A | | 4/1992 | Honka |

(Continued)

FOREIGN PATENT DOCUMENTS

| | | | | |
|---|---|---|---|---|
| JP | 05105861 A | * | 4/1993 | |
| JP | 2012011695 A | * | 1/2012 | ........... B29C 70/342 |

(Continued)

OTHER PUBLICATIONS

Machine translation of JP 2012011695 date unknown.*

(Continued)

*Primary Examiner* — John L Goff, II
(74) *Attorney, Agent, or Firm* — Haynes and Boone, LLP

(57) ABSTRACT

A method and apparatus for forming a tool. A film is applied to a reference part. A vacuum is applied to cause the film to conform to a surface of the reference part such that an adhesive side of the film faces outward from the reference part and a release side of the film conforms to and contacts the reference part. A plurality of composite plates is adhered to the adhesive side of the film over a plurality of flat portions of the reference part. An adhesive material is applied to fill in a plurality of gaps between the plurality of composite plates. The adhesive material is cured to form the tool.

22 Claims, 13 Drawing Sheets

(56) References Cited

U.S. PATENT DOCUMENTS

| | | | |
|---|---|---|---|
| 5,292,475 A * | 3/1994 | Mead | B29C 37/005 |
| | | | 264/258 |
| 2010/0215887 A1 | 8/2010 | Kawabe | |
| 2012/0234489 A1* | 9/2012 | De Mattia | B29C 70/386 |
| | | | 156/60 |
| 2015/0174844 A1 | 6/2015 | Brizon et al. | |
| 2016/0215757 A1 | 7/2016 | Behmer et al. | |
| 2016/0346963 A1 | 12/2016 | Yui et al. | |
| 2017/0036375 A1* | 2/2017 | Gerdisch | B29C 33/3842 |
| 2017/0129193 A1* | 5/2017 | Bye | B29C 70/44 |
| 2018/0036967 A1 | 2/2018 | Deck et al. | |
| 2018/0326922 A1 | 11/2018 | Dellock et al. | |
| 2019/0329511 A1 | 10/2019 | Hernandez et al. | |
| 2021/0095162 A1 | 4/2021 | Fleming | |

FOREIGN PATENT DOCUMENTS

| | | |
|---|---|---|
| WO | WO-9832589 A1 | 7/1998 |
| WO | WO-2016174713 A1 | 11/2016 |

OTHER PUBLICATIONS

Machine translation of JP 05105861 date unknown.*
U.S. Appl. No. 16/588,773, filed Sep. 30, 2019, entitled "Method and Apparatus for Fabrication of Composite Tooling."
U.S. Appl. No. 16/588,846, filed Sep. 30, 2019, entitled "Method and Apparatus for Fabrication of Composite Tooling."

* cited by examiner

METHOD AND APPARATUS FOR FABRICATION OF COMPOSITE TOOLING

CROSS-REFERENCE TO RELATED APPLICATIONS

This application is related to U.S. patent application Ser. No. 16/588,846, filed Sep. 30, 2019, and now U.S. Pat. No. 11,738,526 entitled "METHOD FOR USING COMPOSITE TOOLING TO MANUFACTURE COMPOSITE PARTS," as well as U.S. patent application Ser. No. 16/588,773, filed Sep. 30, 2019, entitled "METHOD AND APPARATUS FOR FABRICATION OF COMPOSITE TOOLING," each of which is incorporated herein by reference in its entirety.

FIELD

This disclosure generally relates to composite manufacturing and, more particularly, to methods and apparatuses for fabricating composite tools having smooth surfaces for use in the fabrication of composite parts.

BACKGROUND

Composite parts are typically manufactured using tools (or tooling), such as cauls. These tools may need to have smooth surfaces on one or more sides when used to fabricate certain types of composite parts. Typically, such a tool is machined from Invar or fabricated from composite. Machining or fabricating this type of tool, however, may be more expensive than desired. Further, the process used to machine or fabricate a tool with the desired level of smoothness may be more time-consuming than desired. In some cases, the currently available processes used to fabricate hard tooling may take longer or may be more difficult or expensive to implement than desired.

SUMMARY

In one illustrative example, a method of forming a tool is provided. A film is applied to a reference part. A vacuum is applied to cause the film to conform to a surface of the reference part such that an adhesive side of the film faces outward from the reference part and a release side of the film conforms to and contacts the reference part. A plurality of composite plates is adhered to the adhesive side of the film over a plurality of flat portions of the reference part. An adhesive material is applied to fill in a plurality of gaps between the plurality of composite plates. The adhesive material is cured to form the tool.

In another illustrative example, a method is provided for fabricating an outer mold line caul. A film is applied over a reference part. A vacuum is applied to cause the film to conform to a surface of the reference part such that an adhesive side of the film faces outward from the reference part and a release side of the film conforms to and contacts the reference part. A plurality of composite plates is adhered to the adhesive side of the film over a plurality of flat portions of the reference part. An adhesive material is applied to fill in a plurality of gaps between the plurality of composite plates. The adhesive material is cured to form the outer mold line caul. The vacuum is removed after curing the adhesive material. The outer mold line caul is removed from the reference part.

The features and functions can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the example embodiments are set forth in the appended claims. The example embodiments, however, as well as a preferred mode of use, further objectives and features thereof, will best be understood by reference to the following detailed description of an example embodiment of the present disclosure when read in conjunction with the accompanying drawings.

DETAILED DESCRIPTION

The example embodiments described below provide methods, apparatuses, and systems for quickly and efficiently fabricating a tool that has a desired level of surface smoothness. The methods, apparatuses, and systems described below provide the ability to fabricate a caul quickly and inexpensively. This caul may be, for example, an outer mold line caul that is used to fabricate composite parts having smooth outer surfaces. In some cases, the caul may be an inner mold line caul that is used to fabricate parts having smooth inner surfaces. In still other cases, the caul may be used to form both an inner mold line and an outer mold line of a part.

As one example, the caul may be used to fabricate an aircraft composite part having at least one of an outer mold line or an inner mold line with a desired level of smoothness. The desired level of smoothness may be a level of smoothness that is within selected tolerances. The aircraft composite part may be, for example, a spar (e.g., a C-spar).

In one illustrative example, a method for forming a tool includes using a reference part and a film having an adhesive side and a release side. A vacuum is applied to cause the film to conform to a surface of the reference part such that the adhesive side of the film faces outward from the reference part and the release side of the film conforms to and contacts the reference part.

A plurality of composite plates is then adhered to the adhesive side of the film over a plurality of flat portions of the reference part. An adhesive material is applied to fill in a plurality of gaps formed once the plurality of composite plates has been adhered to the film. The plurality of composite plates and the adhesive material together form the structure of the tool. The adhesive material is cured to form the tool. This curing may be performed at room temperature or with heat.

The use of the adhesive material as a filler between the plurality of gaps helps join the edges of the plurality of composite plates by bonding these edges together. Further, filling the plurality of gaps with the adhesive material results in a smooth surface on the part of the tool facing the reference part. This smoothness is also present at the transition between a composite plate and the adhesive material next to the edge of the composite plate.

Forming a tool using this type of method, apparatus, and system ensures that the tool has a smooth surface along the portion of the tool that will be used to fabricate one or more composite parts. Further, this process is quick, efficient, and relatively inexpensive, making it easy to introduce at the various stages of manufacturing as needed.

Figure 1:
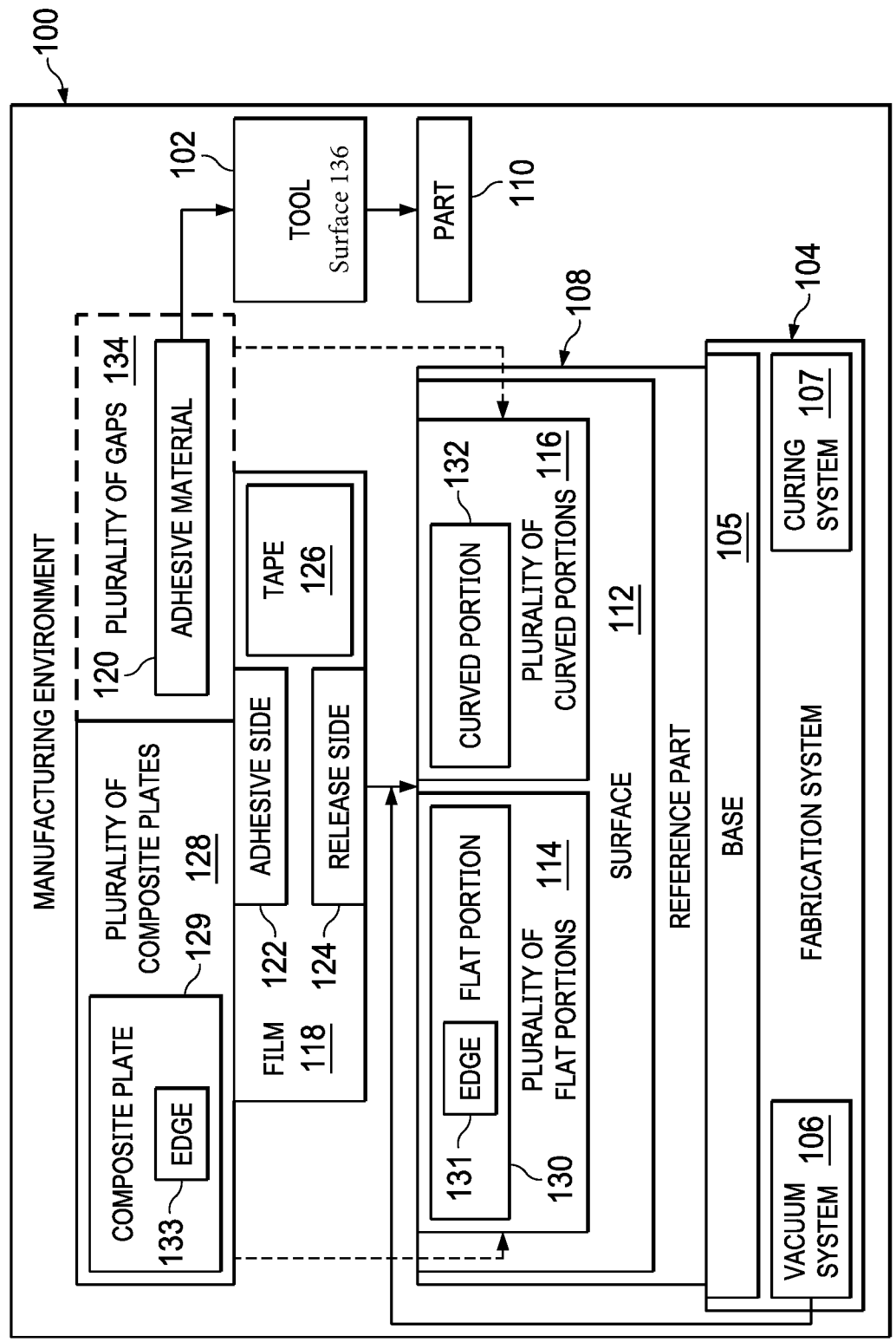
FIG. 1 is a block diagram of a manufacturing environment in accordance with an example embodiment.

Referring now to the figures, FIG. 1 is a block diagram of a manufacturing environment 100 in accordance with an example embodiment. Within manufacturing environment 100, tool 102 is formed. Tool 102 may also be referred to as a caul tool or a caul.

Fabrication system 104 is used to form tool 102 within manufacturing environment 100. In one or more examples, fabrication system 104 includes base 105, vacuum system 106, and, optionally, curing system 107. Base 105 is used to support tool 102 as tool 102 is being formed. In some examples, base 105 takes the form of a table. In other examples, base 105 takes some other form. For example, base 105 may be a floor, a platform, a structure integrated within as part of manufacturing environment 100, or some other type of structure.

Reference part 108 is used to form tool 102. In some examples, reference part 108 may be a physical, three-dimensional model of part 110 having the same specifications as part 110. Depending on the implementation, reference part 108 may be comprised of a metal material, a composite material, some other type of material, or a combination thereof. In one or more illustrative examples, reference part 108 is inflatable.

In some examples, reference part 108 may be a previously formed part having the same specifications as part 110 that is to be fabricated using tool 102. For example, reference part 108 may be a previously formed aircraft part (e.g., aircraft spar, fuselage skin panel, wing skin panel, etc.) that was previously in use. This previously formed part may be near the end of its life cycle and may be used as reference part 108 to form tool 102 that can then be used to fabricate a new part 110 having the same specifications and shape as the previously formed part.

In some illustrative examples, reference part 108 may be a previously formed part that was in use but has been altered, damaged, or otherwise modified such that it needs to be replaced. In these examples, this previously formed part may be modified in some manner to ultimately form reference part 108. For example, the contour of the previously formed part may be altered, material may be added onto the previously formed part, material may be removed from the previously formed part, or some other modification may be performed to produce reference part 108 having a desired contour.

Reference part 108 has surface 112 with various sides and edges. In one or more example embodiments, surface 112 is an outer surface of reference part 108. Surface 112 of reference part 108 has plurality of flat portions 114 and plurality of curved portions 116. For example, plurality of flat portions 114 may form the sides of reference part 108, while plurality of curved portions 116 may form the edges between these sides. In these examples, plurality of flat portions 114 may be referred to as a plurality of flat sides and plurality of curved portions 116 may be referred to as a plurality of curved edges.

In one illustrative example, part 110 is a composite part for an aircraft, such as aircraft 1500 described in FIG. 15 below. In some cases, this composite part may be a spar. The spar may have a cross-sectional shape selected from one of, for example, a C cross-sectional shape, an I cross-sectional shape, an L cross-sectional shape, or some other type of cross-sectional shape. When part 110 to be fabricated is a spar having a C cross-sectional shape, plurality of flat portions 114 of reference part 108 includes three flat sides and plurality of curved portions 116 includes the two edges formed where these three sides meet.

Of course, in other illustrative examples, part 110 may be some other type of part of structure for an aircraft. For example, part 110 may be a beam, a stringer, or some other type of support structure. In still other examples, part 110 may be a composite part for a different type of vehicle, platform, or structure. In some cases, part 110 may be one of several parts that are used to form a final composite part. For example, part 110 may be one of two or more other parts that are used to form a final composite part having an I-type cross-sectional shape, an H-type cross sectional shape, a double horseshoe cross-sectional shape, or some other type of cross-sectional shape.

Fabrication system 104 may also include film 118 and adhesive material 120. In some examples, film 118, adhesive material 120, or both are considered components separate from fabrication system 104. Film 118 has adhesive side 122 and release side 124. Adhesive side 122 is used to adhere, or stick, film 118 to a surface. Release side 124 is a non-adhesive, or non-sticky, side of film 118.

In one illustrative example, film 118 is a polytetrafluoroethylene film in which adhesive side 122 is formed by a coating of silicone pressure sensitive adhesive. In one or more examples, film 118 takes the form of tape 126. Tape 126 may be, for example, pressure sensitive tape. In some cases, Tooltec®, which is a type of pressure sensitive tape, is used as tape 126.

Adhesive material 120 may be a quick-hardening adhesive. In other words, adhesive material 120 may be one that is easily and quickly cured. Additionally, adhesive material 120 may be selected as one that has a high compressive strength at high temperatures (e.g., temperatures at 350 degrees Fahrenheit and higher) and has a thixotropic nature. In some cases, adhesive material 120 may be one that can be cured at room temperature or one that requires heat to be cured.

In one or more examples, adhesive material 120 takes the form of an epoxy paste adhesive. The epoxy paste adhesive may be cured at room temperature. For example, adhesive material 120 may take the form of Hysol® EA 9394, an epoxy paste adhesive that cures at room temperature, has a high compressive strength at high temperatures, and has a thixotropic nature. In some illustrative examples, adhesive material 120 is an adhesive paste that is reinforced with fibers that may include long fibers, short fibers, chopped fibers, or a combination thereof.

Vacuum system 106 is used to vacuum down film 118 onto reference part 108 such that adhesive side 122 of film 118 faces outward from reference part 108 and release side 124 of film 118 conforms to and contacts reference part 108. With adhesive side 122 of film 118 facing outwards, plurality of composite plates 128 may be adhered to adhesive side 122 over plurality of flat portions 114 of reference part 108.

In some illustrative examples, a composite plate of plurality of composite plates 128, such as composite plate 129, may take the form of a solid laminate. In other illustrative examples, composite plate 129 may include at least one face sheet and a core. In still other illustrative examples, composite plate 129 may take some other form.

Each of plurality of composite plates 128 is formed (e.g., cut, trimmed, etc.) to overlap a corresponding one of plurality of flat portions 114. For example, composite plate 129 of plurality of composite plates 128 may be formed to overlap with flat portion 130 of plurality of flat portions 114. Composite plate 129 may be formed to overlap with the entirety of flat portion 130 or overlap with only a portion of flat portion 130.

In one example, edge 131 of flat portion 130 is adjacent to curved portion 132. Composite plate 129 may be formed and positioned over flat portion 130 such that edge 133 of composite plate 129 is stepped back and away from curved portion 132 by a certain distance from edge 131 of flat portion 130. In another example, composite plate 129 is formed and positioned over flat portion 130 such that edge 133 of composite plate 129 aligns with edge 131 of flat portion 130. In still another example, composite plate 129 may be formed and positioned over flat portion 130 such that edge 133 of composite plate 129 extends past edge 131 of flat portion 130 and hangs over at least a portion of curved portion 132.

Adhering plurality of composite plates 128 to film 118 such that plurality of composite plates 128 is placed over plurality of flat portions 114 leaves plurality of gaps 134 on film 118. Plurality of gaps 134 may be along film 118 over the portions of surface 112 of reference part 108 not covered by plurality of composite plates 140. For example, plurality of gaps 134 may be formed between plurality of composite plates 128 over plurality of curved portions 116. In one example, when edge 133 of composite plate 129 extends past edge 131 of flat portion 130 and hangs over at least a portion of curved portion 132, a portion of the corresponding gap is created between curved portion 132 and the portion of composite plate 129 that hangs over curved portion 132.

Adhesive material 120 is used to fill in plurality of gaps 134. For example, adhesive material 120 may be adhered to film 118 over plurality of curved portions 116 of reference part 108.

As discussed above, adhesive material 120 may be cured at room temperature. Once adhesive material 120 has been cured, tool 102 is considered formed. In some illustrative examples, adhesive material 120 is cured with the assistance of heat via curing system 107. For example, curing system 107 may be an autoclave, an oven, or some other type of heating system or device that is used to cure adhesive material 120 within plurality of gaps 134 between plurality of composite plates 128.

Once tool 102 is formed, the vacuum applied by vacuum system 106 may be removed and tool 102 subsequently removed from reference part 108. Tool 102 may then be used to form (e.g., fabricate) part 110. In particular, tool 102 may be used to form multiple parts of the same type as part 110. In these illustrative examples, the finished tool 102 has tooling surface 136. Tooling surface 136 is created by the surfaces of plurality of composite plates 128 and adhesive material 120 within plurality of gaps 134 that faced reference part 108. In these illustrative examples, tooling surface 136 may be used to form the outer surface (e.g., the outer mold line) of part 110. For example, tool 102 may be referred to as an outer mold line (OML) caul. In other illustrative examples, reference part 108 may be shaped and configured such that tooling surface 136 of tool 102 is used to form the inner surface (e.g., the inner mold line) of part 110.

The process of forming tool 102 described above ensures that tooling surface 136 is smooth within selected tolerances. For example, tooling surface 136 has a level of smoothness in which any surface inconsistencies (e.g., ridges, wrinkles, nooks, raised bumps, nicks, uneven portions, etc.) are reduced to within selected tolerances.

The illustration of manufacturing environment 100 in FIG. 1 is not meant to imply physical or architectural limitations to the manner in which an example embodiment may be implemented. Other components in addition to or in place of the ones illustrated may be used. Some components may be optional. Further, the blocks are presented to illustrate functional components. One or more of these blocks may be combined, divided, or combined and divided into different blocks when implemented in an example embodiment.

Although the above example embodiments have been described with respect to a plurality of curved portions 116 of reference part 108, in some cases, surface 112 of reference part 108 may only include a single curved portion. For example, surface 112 of reference part 108 may have only a single curved edge between two flat sides. This type of structure may be seen when, for example, reference part 108 is based on the specifications of a V-shaped or L-shaped part.

Figure 2:
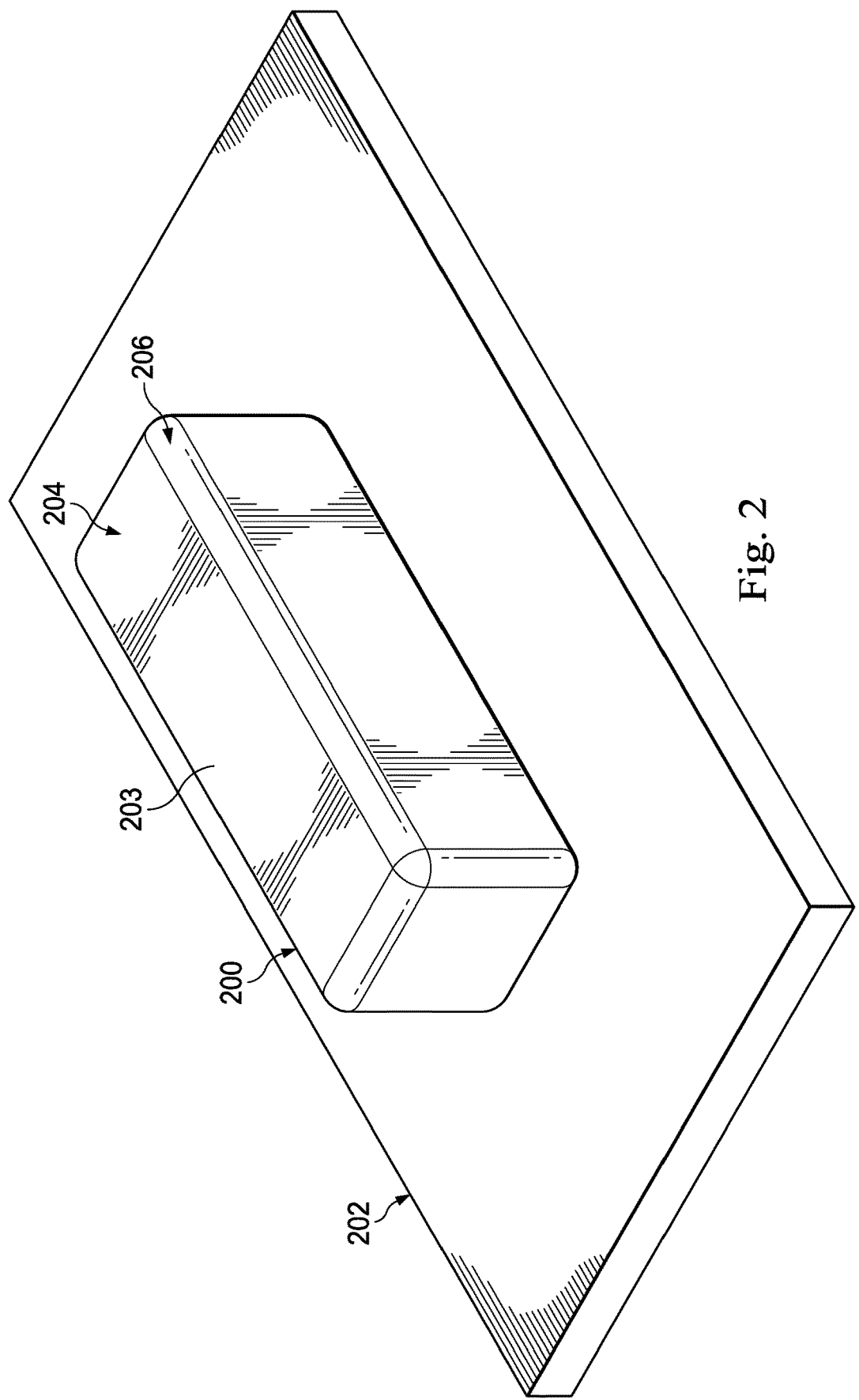
FIG. 2 is an illustration of a reference part in accordance with an example embodiment.

FIGS. 2-6 described below illustrate a fabrication sequence for the fabrication of a tool in accordance with an example embodiment. Turning first to FIG. 2, FIG. 2 is an illustration of a reference part in accordance with an example embodiment. Reference part 200 is positioned over base 202. Reference part 200 and base 202 are examples of implementations for reference part 108 and base 105, respectively, in FIG. 1.

As depicted, reference part 200 has outer surface 203. Outer surface 203 is an example of one implementation for surface 112 of reference part 108 in FIG. 1. Outer surface 203 of reference part 200 has flat portions 204 and curved portions 206, which may be examples of implementations for plurality of flat portions 114 and plurality of curved portions 116 described in FIG. 1.

Flat portions 204 are the substantially flat sides or side surfaces of reference part 200, while curved portions 206 are the curved edges or curved surface edges of reference part 200. Each of flat portions 204 is substantially smooth. As used herein, substantially flat may be flat or generally (e.g., near, around, almost, etc.) flat within selected tolerances.

Similarly, substantially smooth may be smooth or generally (e.g., near, around, almost, etc.) smooth within selected tolerances.

Figure 3:
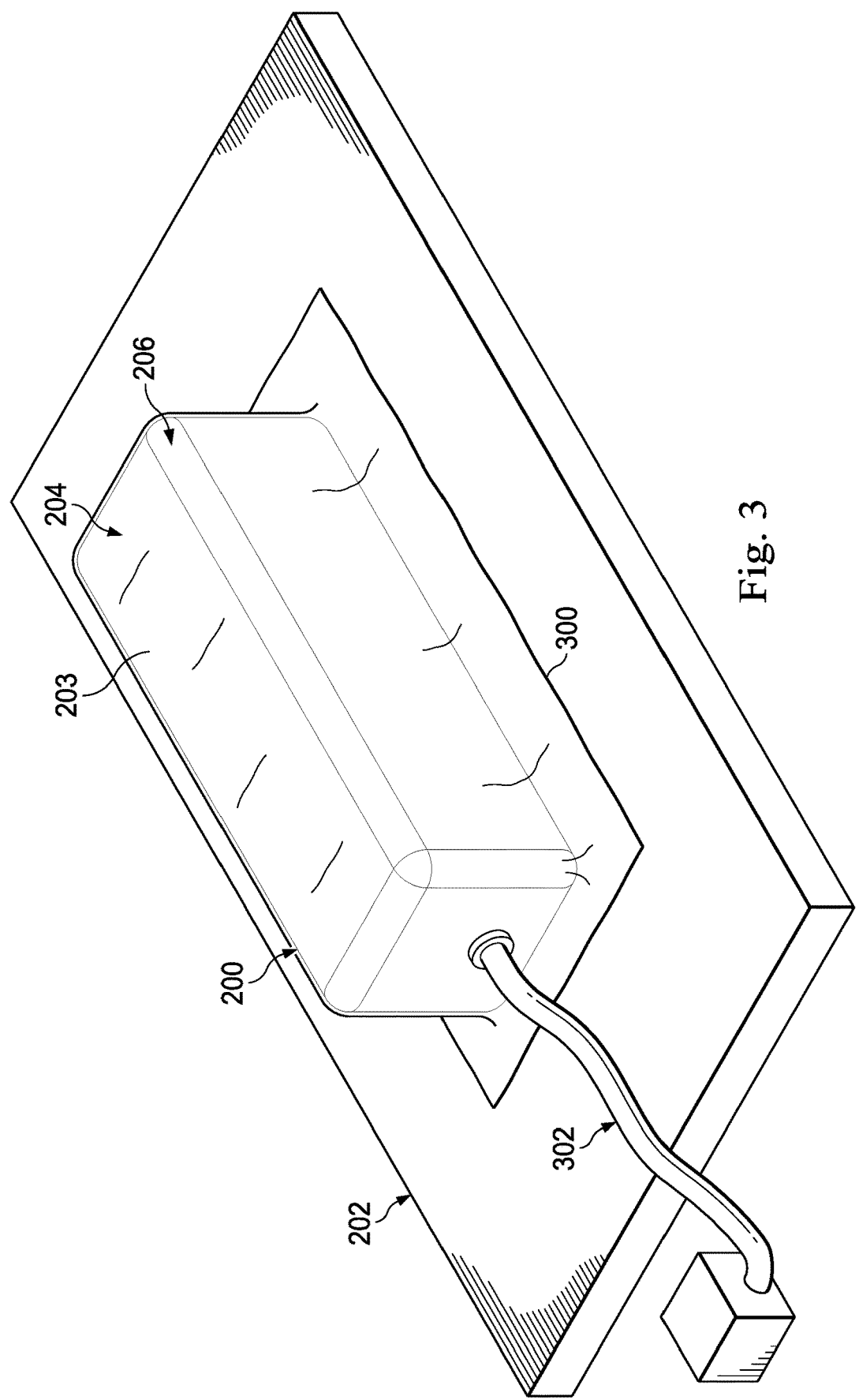
FIG. 3 is an illustration of a vacuum system applying a vacuum to a film positioned over the reference part from FIG. 2 in accordance with an example embodiment.

FIG. 3 is an illustration of a vacuum system applying a vacuum to a film positioned over reference part 200 from FIG. 2 in accordance with an example embodiment. Film 300 is positioned over reference part 200. Film 300 is an example of one implementation for film 118 in FIG. 1.

Film 300 has an adhesive side and a release side. The adhesive side of film 300 faces outward from reference part 200. In some examples, the adhesive side of film 300 may be formed by, for example, an adhesive coating that is applied to film. The release side of film 300 faces outer surface 203 of reference part 200.

In some illustrative examples, film 300 is sealed around reference part 200. For example, the edges of film 300 that contact base 202 may be sealed using tape (e.g., a tacky tape) or some other type of sealer. The sealing of film 300 allows a vacuum to be drawn between film 300 and reference part 200 to cause film 300 to substantially conform to outer surface 203 of reference part 200.

As depicted in FIG. 3, vacuum system 302 may be used to apply a vacuum to cause film 300 to substantially conform to outer surface 203 of reference part 200. Film 300 is vacuumed down onto reference part 200 such that film 300 is substantially conformed to reference part 200 with the adhesive side of film 300 facing outward from reference part 200 and the release side of film 300 conforming to and contacting outer surface 203 of reference part 200. In other words, vacuum system 302 is used to apply a vacuum that causes film 300 to conform to and contact flat portions 204 and curved portions 206 of outer surface 203 of reference part 200.

In these examples, film 300 is substantially conformed to outer surface 203 in a manner that ensures a smooth layer of film 300 over outer surface 203. In other words, film 300 is substantially conformed to outer surface 203 such that any undesired layer inconsistencies in film 118 are within selected tolerances. An undesired layer inconsistency may include, for example, without limitation, at least one of a wrinkle, a crease, a fold, or some other type of inconsistency in the layer formed by film 118.

In one or more illustrative examples, film 300 has elastic properties that help film 300 substantially conform to outer surface 203 in a manner that reduces the possibilities of undesired layer inconsistencies. For example, film 300 may have an elasticity of between 5 and 15 percent that together with the vacuuming helps film 300 substantially conform to outer surface 203 such that overlaps, wrinkles, and other inconsistencies in film 300 are reduced to within selected tolerances.

The release side of film 300 facing reference part 200 will ultimately form the tooling surface of the tool, such as, for example, tooling surface 136 of tool 102 described in FIG. 1. The elasticity of film 300, the vacuuming of film 300 onto reference part 108, or both ensure that film 300 substantially conforms to outer surface 203 in a manner that reduces the possibilities of undesired layer inconsistencies.

Figure 4:
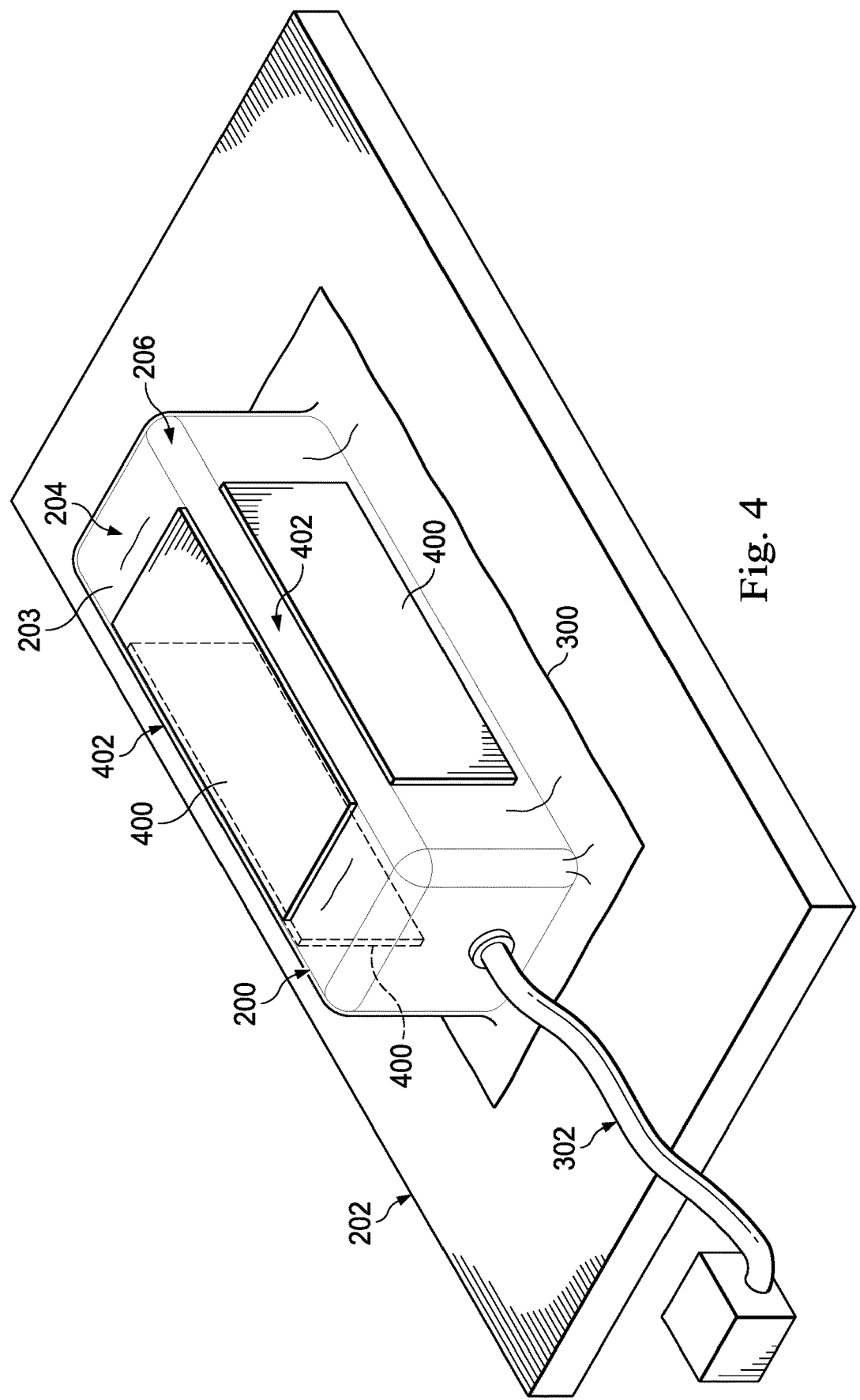
FIG. 4 is an illustration of composite plates adhered to the film from FIG. 3 in accordance with an example embodiment.

FIG. 4 is an illustration of composite plates adhered to film 300 from FIG. 3 in accordance with an example embodiment. Composite plates 400 are an example of one implementation for plurality of composite plates 128 in FIG. 1.

As depicted, composite plates 400 are adhered to film 300 over flat portions 204 of reference part 200. In this illustrative example, composite plates 400 are positioned over flat portions 204 of reference part 200 such that each of composite plates 400 does not extend over a radius of curvature of curved portions 206. Further, each of composite plates 400 is adhered to film 300 such that a substantially smooth surface of that composite plate faces film 300. A composite plate may be adhered to film 300 by applying a force to the composite plate such that the composite plate adheres to the adhesive side of film 300. In other words, the composite plate may be pressed down onto the adhesive side of film 300.

Gaps 402 are formed along the portions of film 300 not covered by composite plates 400. For example, gaps 402 may be formed between composite plates 400, at edges or ends of composite plates 400, or both. In this example, gaps 402 are formed between composite plates 400 over curved portions 206 of reference part 200.

Figure 5:
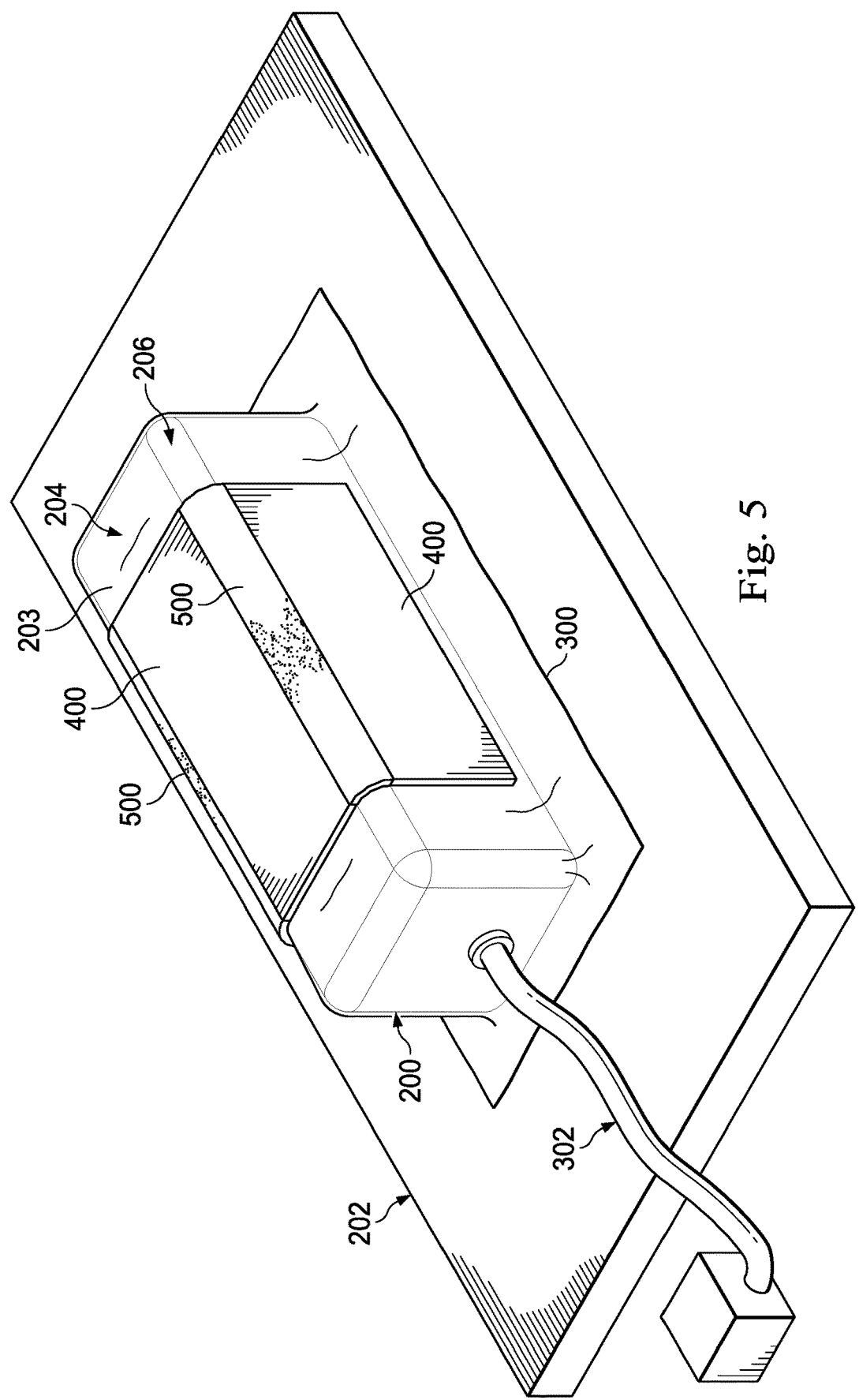
FIG. 5 is an illustration of adhesive material that is used to fill the gaps between composite plates from FIG. 4 in accordance with an example embodiment.

FIG. 5 is an illustration of adhesive material that is used to fill the gaps between composite plates 400 from FIG. 4 in accordance with an example embodiment. Adhesive material 500 is an example of one implementation for adhesive material 120 in FIG. 1. Adhesive material 500 is applied to fill in gaps 402 from FIG. 4 between composite plates 400.

Adhesive material 500 is a quick-hardening material. In this illustrative example, adhesive material 500 may be an epoxy paste adhesive that cures at room temperature. In other examples, curing adhesive material 500 may require the assistance of heat via an autoclave, an oven, or some other type of heating system or device. Once adhesive material 500 has cured, the vacuum being applied by vacuum system 302 may be removed and the finished tool may be removed off of reference part 200. The release side of film 300 allows the finished tool to be easily removed off of reference part 200.

Figure 6:
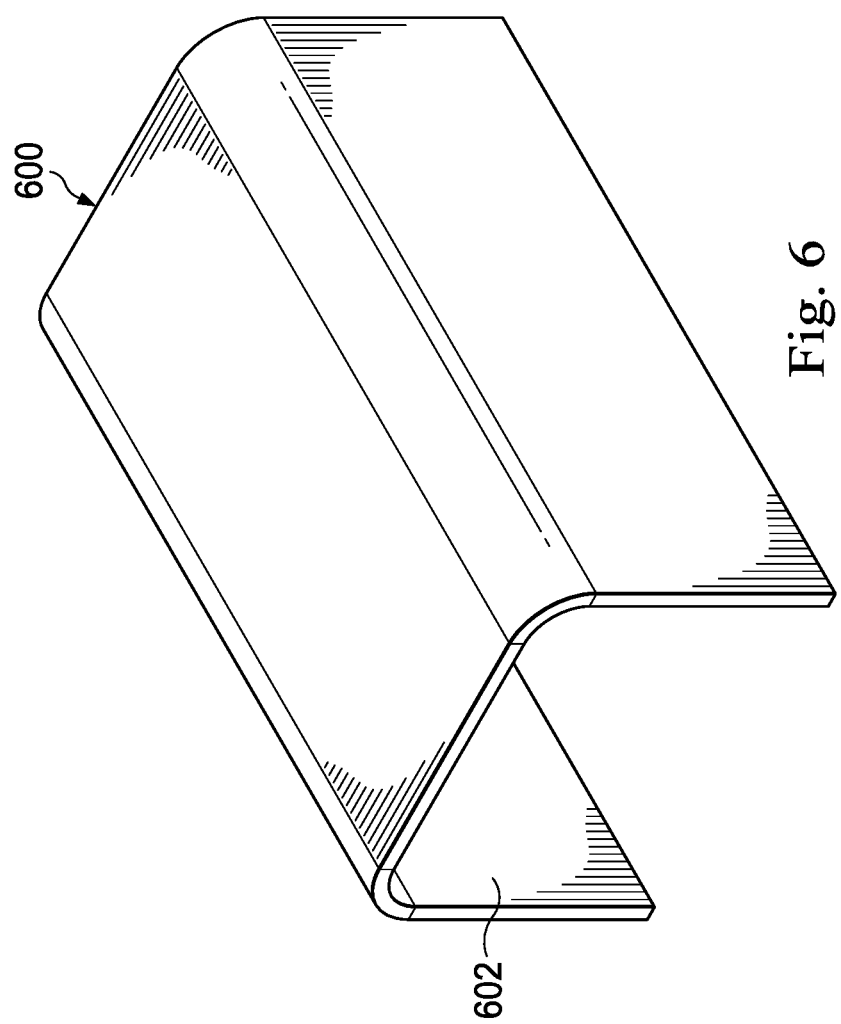
FIG. 6 is an illustration of a finished tool in accordance with an example embodiment.

FIG. 6 is an illustration of a finished tool in accordance with an example embodiment. Tool 600 has been removed from reference part 200 from FIG. 5 and is ready for use in fabricating composite parts. As described above with respect to FIGS. 2-6, tool 600 is formed quickly, efficiently, and inexpensively.

In one or more examples, tool 600 may be an outer mold line caul that can be used to form the outer surfaces of composite parts with a desired level of smoothness. In other words, tool 600 has tooling surface 602 that is substantially smooth (i.e., having a level of smoothness within selected tolerances). The release side of film 300 that faced reference part 200, as shown in FIGS. 3-5, has become tooling surface 602.

Figure 7:
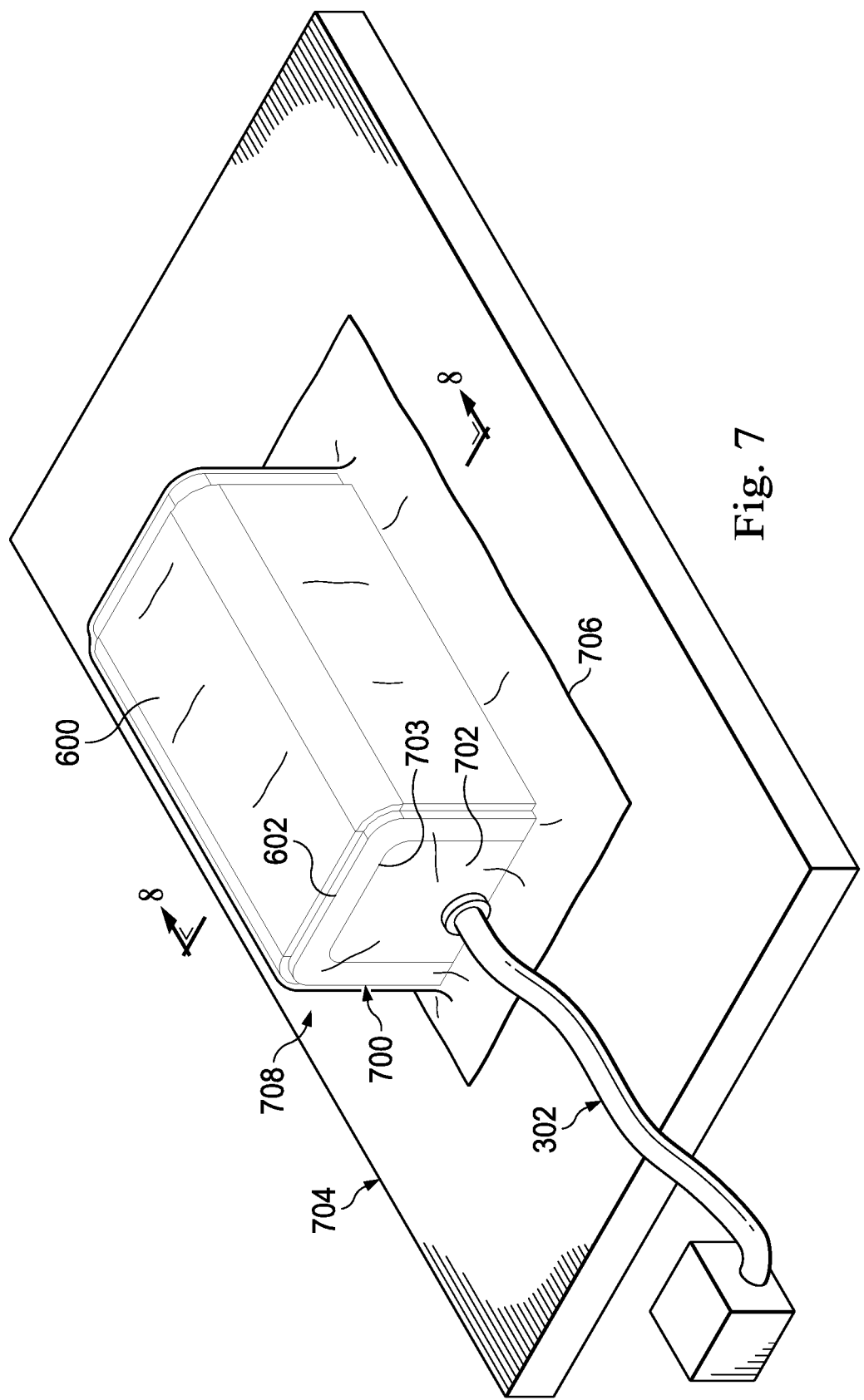
FIG. 7 is an illustration of the manufacturing of a composite part using the tool from FIG. 6 in accordance with an example embodiment.

FIG. 7 is an illustration of the manufacturing of a composite part using tool 600 from FIG. 6 in accordance with an example embodiment. Composite laminate 700 is formed over inner mold line tool 702 positioned over base 704. Inner mold line tool 702 provides inner mold line 703 for composite laminate 700. Inner mold line tool 702 may also be referred to as an inner mandrel. Tool 600 is placed against composite laminate 700 in which tooling surface 602 of tool 600 is used to create an outer mold line for composite laminate 700. In this example embodiment, tool 600 may also be referred to as an outer mold line tool.

Vacuum bag 706 is positioned over stack-up 708 comprising inner mold line tool 702, composite laminate 700, and tool 600. Vacuum system 302 is used to draw a vacuum while stack-up 708 is cured using air, heat, pressure, or a combination thereof. Once curing is complete, inner mold line tool 702 and tool 600 may be removed to leave a final composite part.

Figure 8:
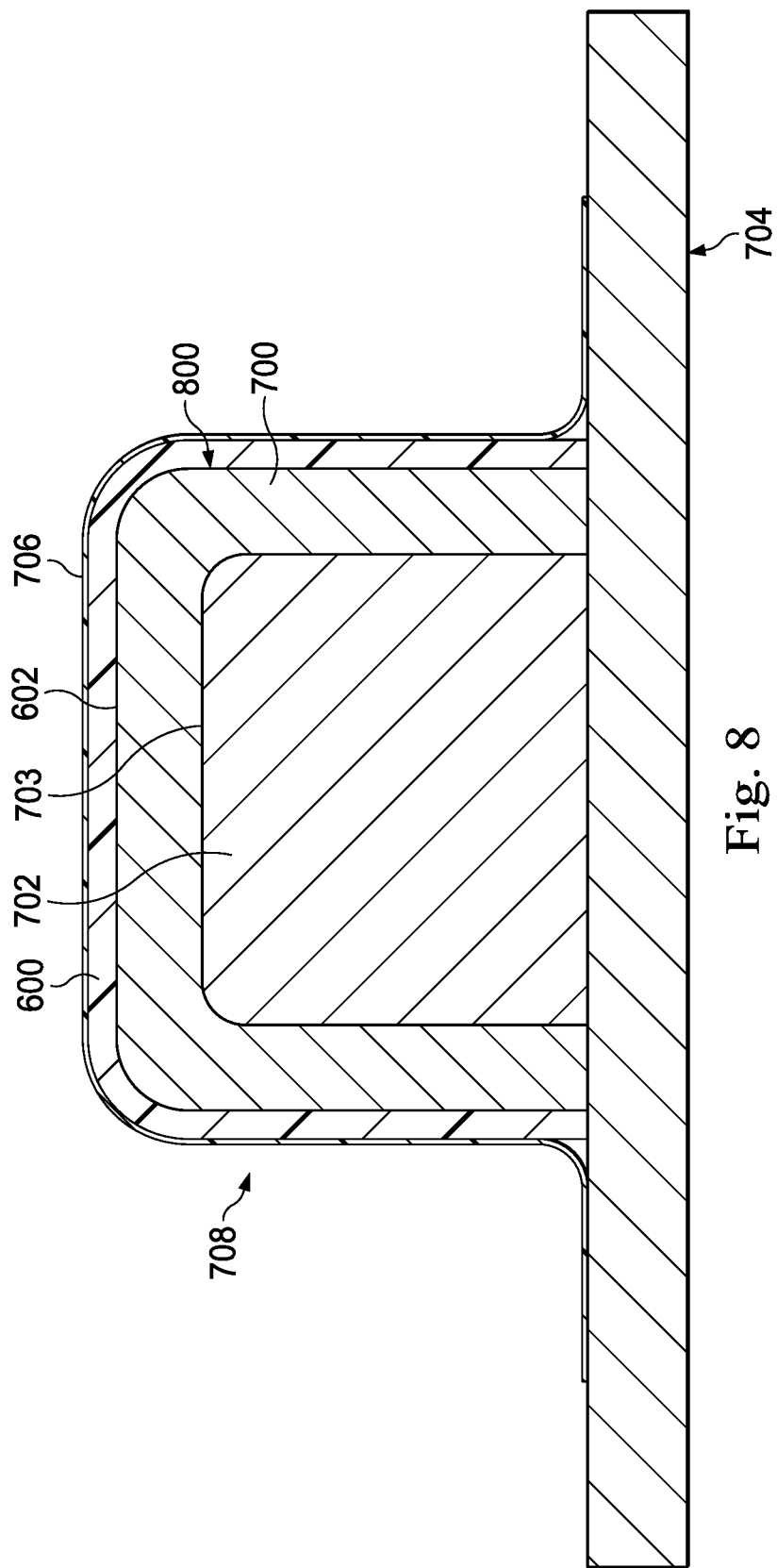
FIG. 8 is an illustration of a cross-sectional view of the manufacturing of the composite part using the tool from FIG. 7 in accordance with an example embodiment.

FIG. 8 is an illustration of a cross-sectional view of the manufacturing of the composite part using tool 600 from FIG. 7 in accordance with an example embodiment. In particular, the view in FIG. 8 is taken with respect to lines 8-8 in FIG. 7.

In this example, inner mold line tool 702 is positioned over base 704. Composite laminate 700 is shown positioned over inner mold line tool 702, which forms inner mold line 703 for composite laminate 700. Tool 600 is positioned over composite laminate 700. Tool 600 has tooling surface 602 which provides outer mold line 800 for composite laminate 700. Further, vacuum bag 706 is shown positioned over tool 600.

Figure 9:
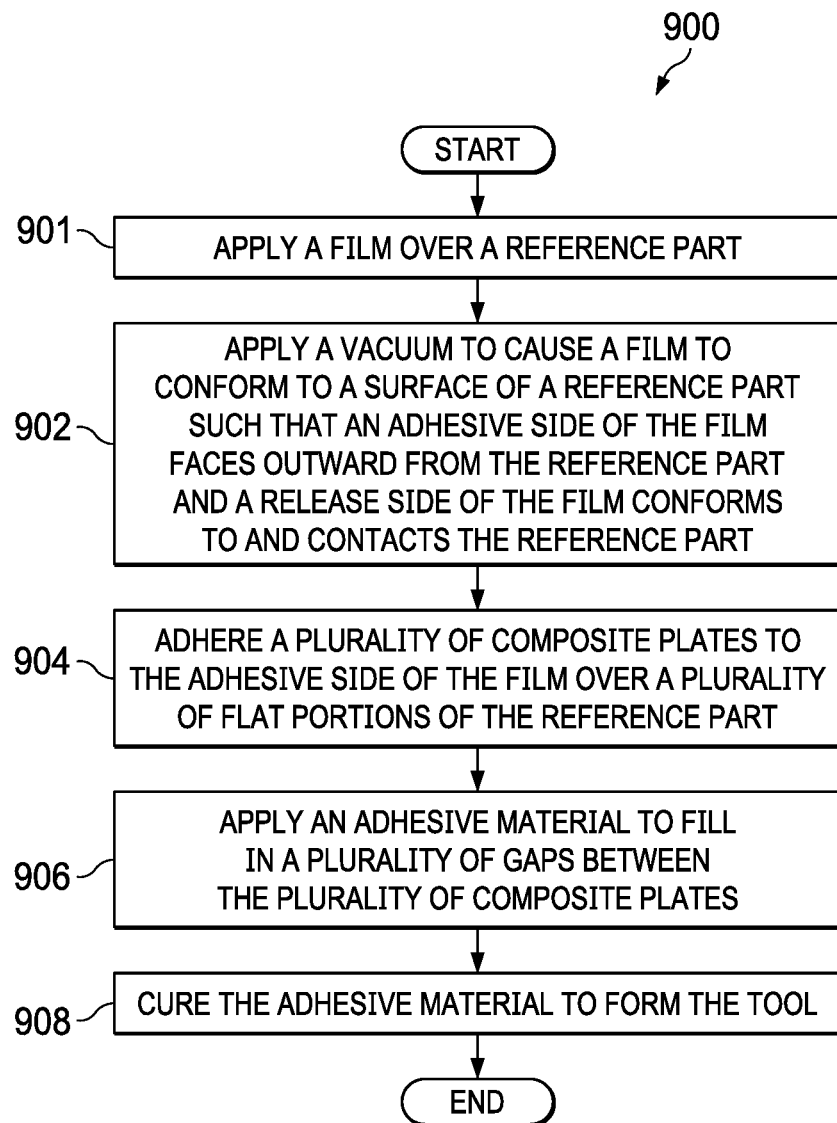
FIG. 9 is a flowchart of a process for forming a tool in accordance with an example embodiment.

FIG. 9 is a flowchart of a process for forming a tool in accordance with an example embodiment. The process 900 illustrated in FIG. 9 may be performed using, for example, fabrication system 104 described in FIG. 1. Further, process 900 may be used to form, for example, tool 102 in FIG. 1.

Process 900 begins by applying a film over the reference part (operation 901). Then, a vacuum is applied to cause a film to conform to a surface of a reference part such that an adhesive side of the film faces outward from the reference part and a release side of the film conforms to and contacts the reference part (operation 902). In operation 902, the vacuum is applied such that the vacuum is drawn between the film and the reference part.

The film has an elasticity that allows it to substantially conform to the outer surface of the reference part when the film is laid over the reference part and when the vacuum is drawn. This elasticity helps to ensure that any undesired layer inconsistencies (e.g., wrinkles, overlaps, etc.) in this film layer over the reference part are prevented or reduced to within selected tolerances.

Next, a plurality of composite plates is adhered to the adhesive side of the film over a plurality of flat portions of the reference part (operation 904). An adhesive material is applied to fill in a plurality of gaps between the plurality of composite plates (operation 906). The adhesive material is cured to form the tool (operation 908), with the process terminating thereafter.

Figure 10:
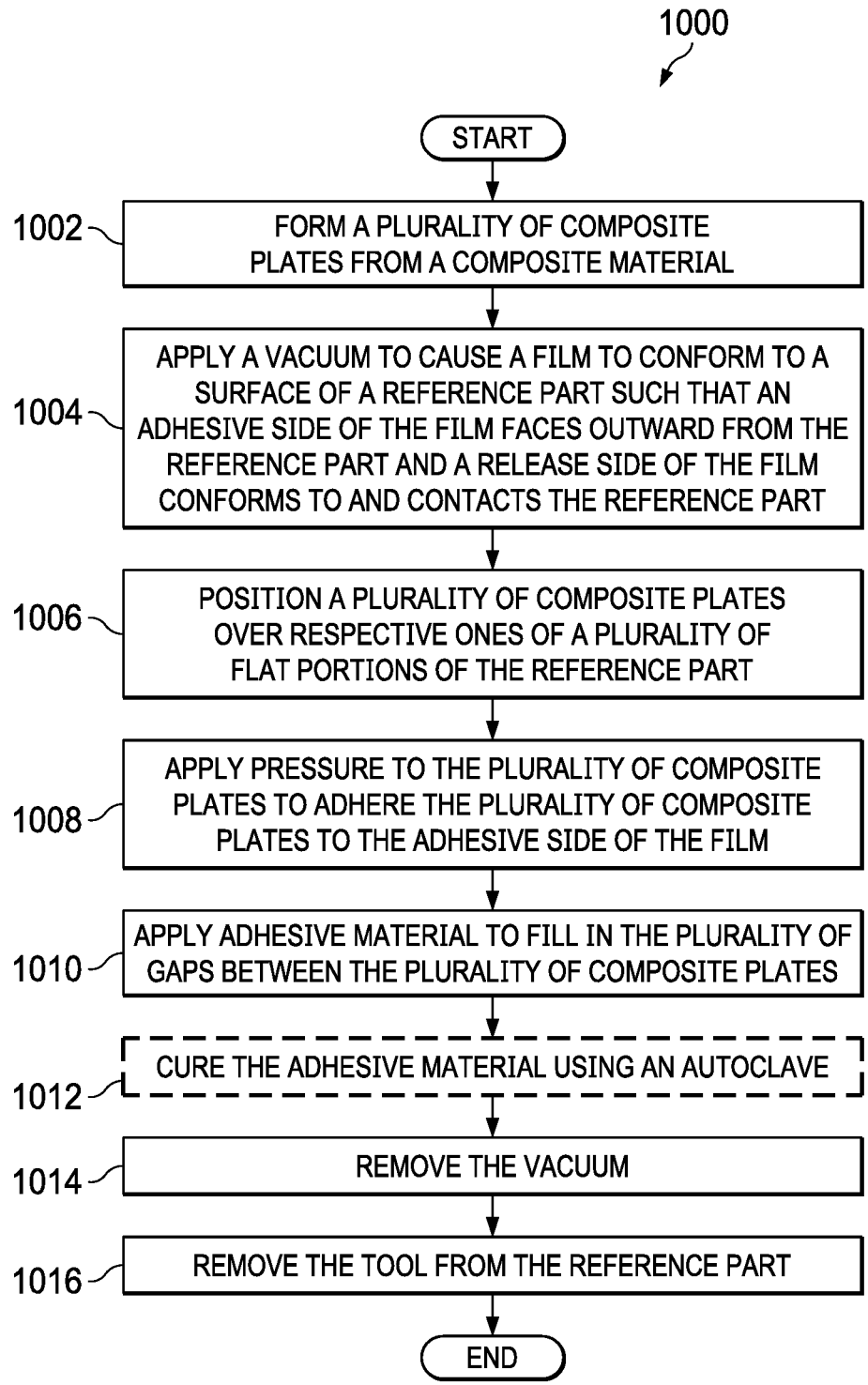
FIG. 10 is a flowchart of a process for forming a tool in accordance with an example embodiment.

FIG. 10 is a flowchart of a process for forming a tool in accordance with an example embodiment. Process 1000 illustrated in FIG. 10 may be performed using, for example, fabrication system 104 described in FIG. 1. Further, process 1000 may be used to form, for example, tool 102 in FIG. 1.

Process 1000 begins by forming a plurality of composite plates from a composite material (operation 1002). In operation 1002, the plurality of composite plates may be cut from the composite material. The plurality of composite plates may be formed such that each composite plate is substantially flat and has a substantially smooth surface on at least one side.

Thereafter, a vacuum is applied to cause a film to conform to a surface of a reference part such that an adhesive side of the film faces outward from the reference part and a release side of the film conforms to and contacts the reference part (operation 1004). The reference part has a plurality of flat portions and a plurality of curved portions. The flat portions form the sides of the reference part, while the curved portions form the edges between these sides. For example, each of the plurality of curved portions may be a curved edge between two sides of the reference part having a radius of curvature.

The plurality of composite plates is positioned over respective ones of the plurality of flat portions of the reference part (operation 1006). In operation 1006, each composite plate is positioned such that the substantially smooth surface of the composite plate faces the adhesive side of the film and is positioned directly over a corresponding flat portion of the reference part. Pressure is applied to the plurality of composite plates to adhere the plurality of composite plates to the adhesive side of the film (operation 1008).

In this manner, via operations 1006 and 1008, plurality of composite plates is adhered to the adhesive side of the film over the plurality of flat portions of the reference part. Because the plurality of composite plates is formed such that each of the composite plates does not extend over a radius of curvature of the reference part, a plurality of gaps is formed.

Adhesive material is applied to fill in the plurality of gaps between the plurality of composite plates (operation 1010). The adhesive material is a quick-hardening adhesive that may be cured at room temperature or with the assistance of heat using, for example, an autoclave. Thus, optionally, the adhesive material may be cured (operation 1012). Operation 1012 may be performed using air, heat, pressure, or a combination thereof.

Once the adhesive material has been cured, the tool is considered formed. The vacuum is then removed (operation 1014). Next, the tool is removed from the reference part (operation 1016), with the process terminating thereafter.

The tool is then ready for use in the fabrication of composite parts. In particular, the tool may be used to fabricate a composite part such that the composite part has a desired level of surface smoothness. In one example, the tool is an outer mold line tool used to form the outer surface of a composite part.

Figure 11:
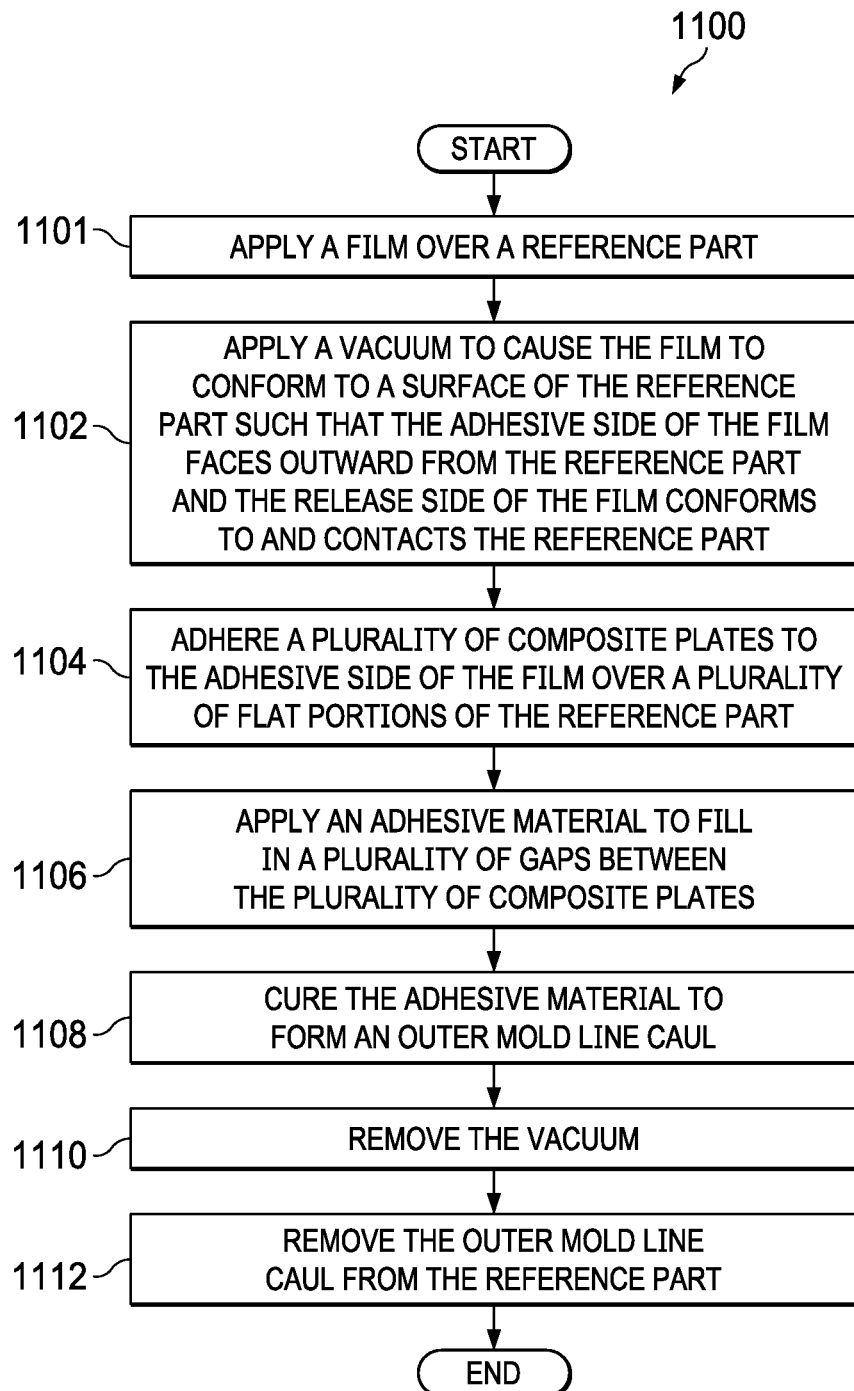
FIG. 11 is a flowchart of a process for fabricating an outer mold line caul in accordance with an example embodiment.

FIG. 11 is a flowchart of a process for fabricating an outer mold line caul in accordance with an example embodiment. Process 1100 illustrated in FIG. 11 may be performed using, for example, fabrication system 104 described in FIG. 1. Further, process 1100 may be used to form, for example, tool 102 in FIG. 1.

Process 1100 begins by applying a film over a reference part (operation 1101). The film includes a release side and an adhesive side. The release side of the film will eventually form the tooling surface for the tool formed by process 1100. Next, a vacuum is applied to cause the film to conform to a surface of the reference part such that the adhesive side of the film faces outward from the reference part and the release side of the film conforms to and contacts the reference part (operation 1102).

In some example embodiments, the film has an elasticity that allows it to substantially conform the surface of the reference part. Operation 1102 helps ensure that the release side of the film is stretched and substantially conformed to the surface of the reference part such that any undesired layer inconsistencies (e.g., wrinkles, overlaps, etc.) in the film layer are reduced to within selected tolerances.

A plurality of composite plates is adhered to the adhesive side of the film over a plurality of flat portions of the reference part (operation 1104). An adhesive material is applied to fill in a plurality of gaps between the plurality of composite plates (operation 1106). In this manner, both the plurality of composite plates and the adhesive material are adhered to the adhesive side of the film. The adhesive material is used to join the plurality of composite plates together.

The adhesive material is cured to form the outer mold line caul (operation 1108). The release side of the film will be used to create an outer mold line of a part while the plurality of composite plates joined by the cured adhesive material provides the caul with strength. The vacuum is then removed (operation 1110). The outer mold line caul is then removed from the reference part (operation 1112), with the process terminating thereafter.

Figure 12:
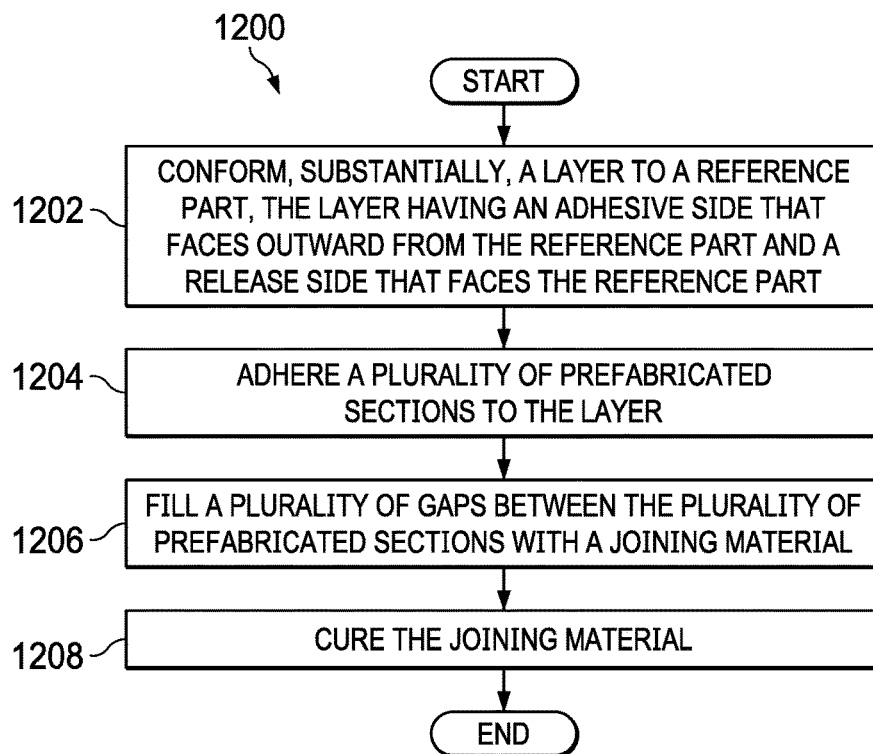
FIG. 12 is a flowchart of a process for forming a tool in accordance with an example embodiment.

FIG. 12 is a flowchart of a process for forming a tool in accordance with an example embodiment. Process 1200 illustrated in FIG. 12 may be performed using, for example, fabrication system 104 described in FIG. 1. Further, process 1200 may be used to form, for example, tool 102 in FIG. 1 or tool 600 in FIG. 6.

Process 1200 begins by substantially conforming a layer to a reference part, the layer having an adhesive side that faces outward from the reference part and a release side that faces the reference part (operation 1202). A plurality of prefabricated sections is adhered to the layer (operation 1204). The plurality of prefabricated sections may be, for example, a plurality of composite plates such as plurality of composite plates 128 in FIG. 1. A plurality of gaps between the plurality of prefabricated sections is filled with a joining material (operation 1206). Thereafter, optionally, the joining material is cured (operation 1208), with the process terminating thereafter. After the curing in operation 1208, the final tool is considered formed and may be removed from the reference part and used for manufacturing composite parts.

In process 1200, the joining material may be, for example, a quick-hardening adhesive material. Further, layer described in operation 1202 may be a film such as, for example, without limitation, a pressure sensitive tape. Depending on the implementation, each of the plurality of prefabricated sections described in operation 1204 may be a composite plate or some other type of composite section.

Figure 13:
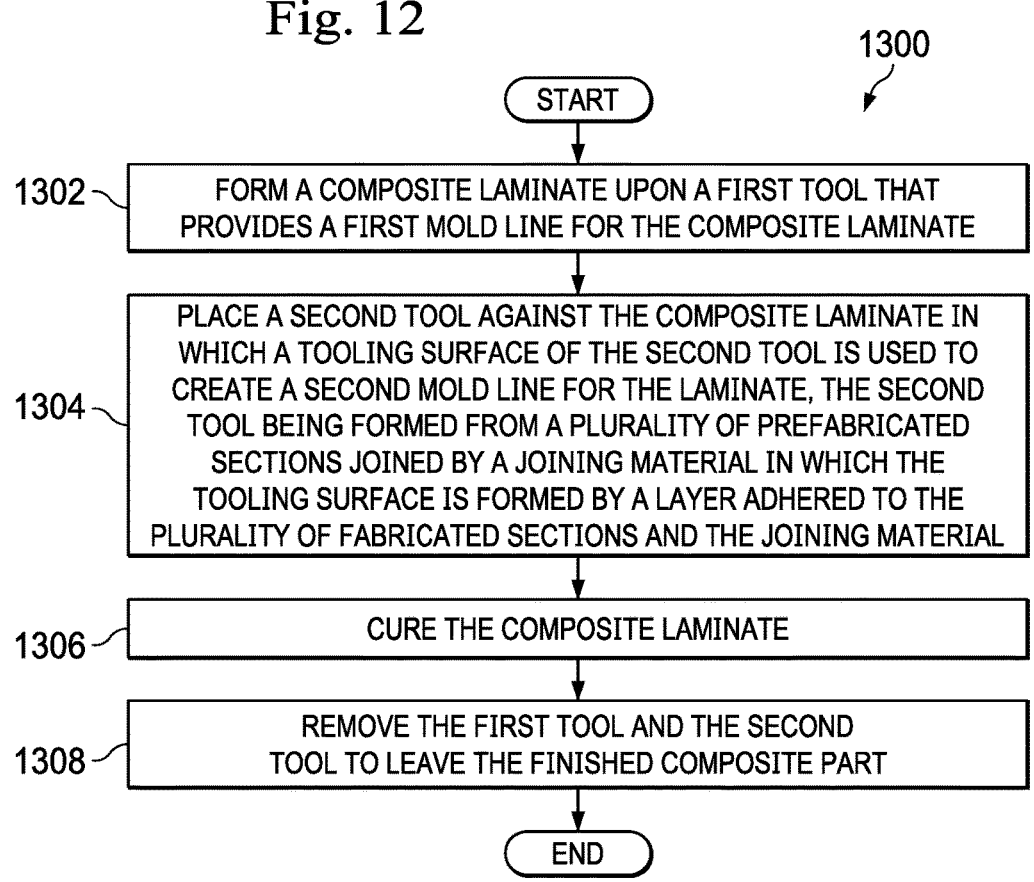
FIG. 13 is a flowchart of a process for manufacturing a composite part in accordance with an example embodiment.

FIG. 13 is a flowchart of a process for manufacturing a composite part in accordance with an example embodiment. Process 1300 illustrated in FIG. 13 may be performed using a tool such as tool 102 in FIG. 1 or tool 600 in FIG. 6.

Process 1300 begins by forming a composite laminate upon a first tool that provides a first mold line for the composite laminate (operation 1302). In some illustrative examples, the first tool is fabricated using the process of or analogous to process 1200 in FIG. 12.

Thereafter, a second tool is placed against the composite laminate in which a tooling surface of the second tool is used to create a second mold line for the laminate, the second tool being formed from a plurality of prefabricated sections joined by a joining material in which the tooling surface is formed by a layer adhered to the plurality of prefabricated sections and the joining material (operation 1304). In operation 1304, the second tool may be, for example, tool 102 described in FIG. 1, tool 600 described in FIG. 6, or a tool formed in a manner similar to tool 102 or tool 600. The second tool may be fabricated using the process of or one analogous to process 1200 in FIG. 12. Thus, either the first tool used in operation 1302, the second tool used in operation 1304, or both may be fabricated using the process of or one analogous to process 1200 in FIG. 12.

Thereafter, the composite laminate may be cured (operation 1306). Operation 1306 may be performed using air, heat, pressure, or a combination thereof. As one illustrative example, operation 1306 may be performed using an autoclave, oven, or other type of heat source. The first tool and the second tool are then removed to leave the finished composite part (operation 1308), with the process terminating thereafter. Operation 1308 may be performed using a demolding process.

Figure 14:
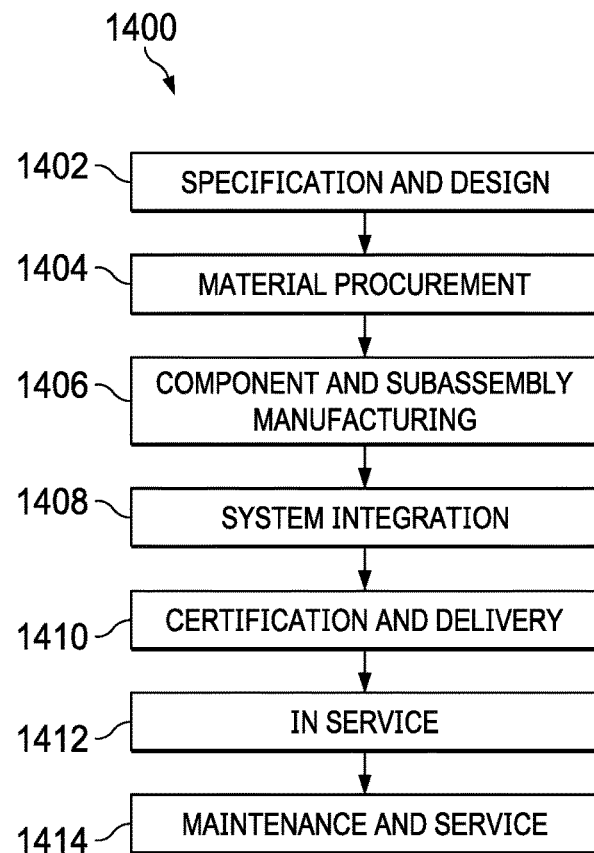
FIG. 14 is an illustration of an aircraft manufacturing and service method in accordance with an example embodiment.
Figure 15:
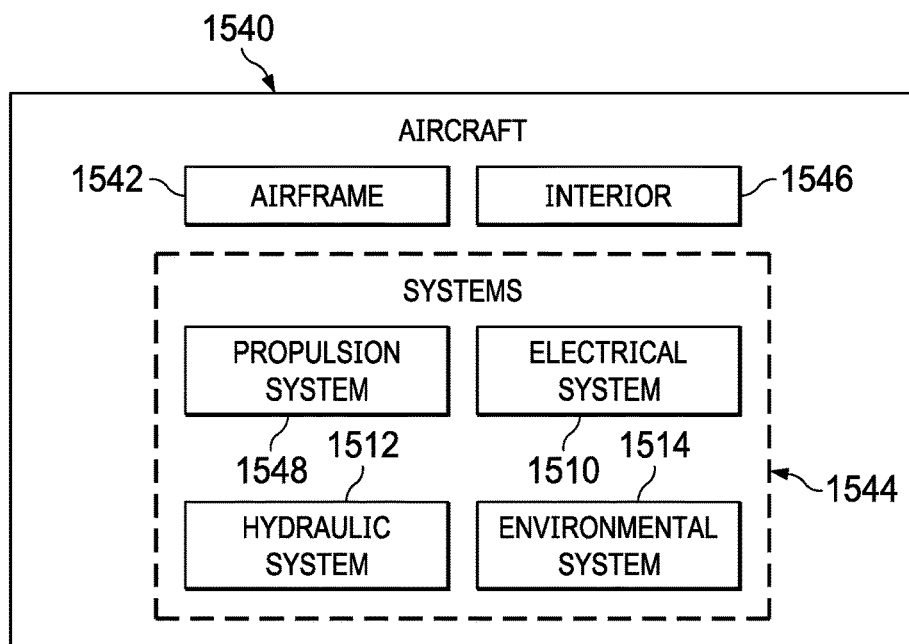
FIG. 15 is a block diagram of an aircraft in accordance with an example embodiment.

Example embodiments of the disclosure may be described in the context of aircraft manufacturing and service method 1400 as shown in FIG. 14 and aircraft 1500 as shown in FIG. 15. Turning first to FIG. 14, an illustration of an aircraft manufacturing and service method is depicted in accordance with an illustrative embodiment. During pre-production, aircraft manufacturing and service method 1400 may include specification and design 1402 of aircraft 1500 in FIG. 15 and material procurement 1404.

During production, component and subassembly manufacturing 1406 and system integration 1408 of aircraft 1500 in FIG. 15 takes place. Thereafter, aircraft 1500 in FIG. 15 may go through certification and delivery 1410 in order to be placed in service 1412. While in service 1412 by a customer, aircraft 1500 in FIG. 15 is scheduled for routine maintenance and service 1414, which may include modification, reconfiguration, refurbishment, and other maintenance or service.

Each of the processes of aircraft manufacturing and service method 1400 may be performed or carried out by a system integrator, a third party, and/or an operator. In these examples, the operator may be a customer. For the purposes of this description, a system integrator may include, without limitation, any number of aircraft manufacturers and major-system subcontractors; a third party may include, without limitation, any number of vendors, subcontractors, and suppliers; and an operator may be an airline, a leasing company, a military entity, a service organization, and so on.

With reference now to FIG. 15, an illustration of an aircraft is depicted in which an illustrative embodiment may be implemented. In this example, aircraft 1500 is produced by aircraft manufacturing and service method 1400 in FIG. 14 and may include airframe 1502 with plurality of systems 1504 and interior 1506. Examples of systems 1504 include one or more of propulsion system 1508, electrical system 1510, hydraulic system 1512, and environmental system 1514. Any number of other systems may be included. Although an aerospace example is shown, different illustrative embodiments may be applied to other industries, such as the automotive industry.

Apparatuses and methods embodied herein may be employed during at least one of the stages of aircraft manufacturing and service method 1400 in FIG. 14. In particular, fabrication system 144 from FIG. 1 may be used to fabricate tool 142 during any one of the stages of aircraft manufacturing and service method 1400. For example, without limitation, fabrication system 144 from FIG. 1 may be used to fabricate tool 142 during at least one of material procurement 1404, component and subassembly manufacturing 1406, system integration 1408, in service 1412, routine maintenance and service 1414, or some other stage of aircraft manufacturing and service method 1400. Still further, fabrication system 144 may be used to fabricate tool 142 for use in fabricating composite parts for at least one of airframe 1502, plurality of systems 1504, interior 1506, or a combination thereof of aircraft 1500 in FIG. 15.

In one illustrative example, components or subassemblies produced in component and subassembly manufacturing 1406 in FIG. 14 may be fabricated or manufactured in a manner similar to components or subassemblies produced while aircraft 1500 is in service 1412 in FIG. 14. As yet another example, one or more apparatus embodiments, method embodiments, or a combination thereof may be utilized during production stages, such as component and subassembly manufacturing 1406 and system integration 1408 in FIG. 14. One or more apparatus embodiments, method embodiments, or a combination thereof may be utilized while aircraft 1500 is in service 1412 and/or during maintenance and service 1414 in FIG. 14. The use of a number of the different illustrative embodiments may substantially expedite the assembly of and/or reduce the cost of aircraft 1500.

The flowcharts and block diagrams in the different depicted embodiments illustrate the architecture, functionality, and operation of some possible implementations of apparatuses and methods in an example embodiment. In this regard, each block in the flowcharts or block diagrams may represent a module, a segment, a function, and/or a portion of an operation or step.

In some alternative implementations of an example embodiment, the function or functions noted in the blocks may occur out of the order noted in the figures. For example, in some cases, two blocks shown in succession may be executed substantially concurrently, or the blocks may sometimes be performed in the reverse order, depending upon the functionality involved. Also, other blocks may be added in addition to the illustrated blocks in a flowchart or block diagram.

As used herein, the phrase "at least one of," when used with a list of items, means different combinations of one or more of the listed items may be used and only one of the items in the list may be needed. The item may be a particular object, thing, step, operation, process, or category. In other words, "at least one of" means any combination of items or number of items may be used from the list, but not all of the items in the list may be required. For example, without limitation, "at least one of item A, item B, or item C" or "at least one of item A, item B, and item C" may mean item A; item A and item B; item B; item A, item B, and item C; item B and item C; or item A and C. In some cases, "at least one of item A, item B, or item C" or "at least one of item A, item B, and item C" may mean, but is not limited to, two of item A, one of item B, and ten of item C; four of item B and seven of item C; or some other suitable combination.

The description of the different example embodiments has been presented for purposes of illustration and description, and is not intended to be exhaustive or limited to the embodiments in the form disclosed. Many modifications and variations will be apparent to those of ordinary skill in the art. Further, different example embodiments may provide different features as compared to other desirable embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. A method of forming a tool, the method comprising:
   applying a film to a reference part;
   applying a vacuum to cause the film to conform to a surface of the reference part such that an adhesive side of the film faces outward from the reference part and a release side of the film conforms to and contacts the reference part;
   after applying the vacuum and before removing the vacuum, positioning a plurality of composite plates over a plurality of flat portions of the reference part and adhering the plurality of composite plates to the adhesive side of the film over the plurality of flat portions of the reference part;
   applying an adhesive material to fill in a plurality of gaps between the plurality of composite plates;
   curing the adhesive material to form the tool; and
   removing the vacuum.

2. The method of claim 1, further comprising, before applying the vacuum, sealing the film around the reference part to allow the vacuum to be drawn between the film and the reference part;
   wherein the film is polytetrafluoroethylene.

3. The method of claim 1, further comprising:
   forming each of the plurality of composite plates from a composite material that either is a composite laminate or includes at least one face sheet and a core.

4. The method of claim 1, wherein curing the adhesive material comprises:
   curing the adhesive material using at least one of air or heat.

5. The method of claim 1, wherein adhering the plurality of composite plates to the adhesive side of the film comprises:
   positioning the plurality of composite plates over respective ones of the plurality of flat portions; and
   applying a force to the plurality of composite plates to adhere the plurality of composite plates to the adhesive side of the film.

6. The method of claim 1, wherein:
   the vacuum is removed after curing the adhesive material; and
   the method further comprises removing the tool from the reference part.

7. The method of claim 1, wherein the film is a pressure sensitive tape.

8. The method of claim 1, further comprising removing the tool from the reference part, the tool comprising:
   at least part of the film;
   at least part of each of the composite plates adhered to the adhesive side of the film; and
   at least part of the cured adhesive material.

9. A fabrication method comprising:
   forming a tool by the method of claim 1, and then fabricating a composite part using the tool.

10. The fabrication method of claim 9, wherein the composite part is an aircraft composite part.

11. A method of forming a tool, the method comprising:
    applying a film to a reference part;
    applying a vacuum to cause the film to conform to a surface of the reference part such that an adhesive side of the film faces outward from the reference part and a release side of the film conforms to and contacts the reference part;
    adhering a plurality of composite plates to the adhesive side of the film over a plurality of flat portions of the reference part;
    applying an adhesive material to fill in a plurality of gaps between the plurality of composite plates; and
    curing the adhesive material to form the tool;
    wherein the method further comprises, before applying the vacuum, sealing the film around the reference part to allow the vacuum to be drawn between the film and the reference part.

12. The method of claim 11, further comprising:
    sizing a composite plate of the plurality of composite plates such that the composite plate overlaps an entirety of a corresponding flat portion when positioned over the corresponding flat portion;
    wherein the film is polytetrafluoroethylene.

13. The method of claim 11, wherein forming the plurality of composite plates comprises:
    sizing a composite plate of the plurality of composite plates such that the composite plate is offset from an edge of a corresponding flat portion or extends past the edge and hangs over a curved portion that is adjacent to the edge.

14. The method of claim 11, further comprising removing the tool from the reference part, the tool comprising:
at least part of the film;
at least part of each of the composite plates adhered to the adhesive side of the film; and
at least part of the cured adhesive material.

15. A method for fabricating an outer mold line caul, the method comprising:
applying a film over a reference part;
applying a vacuum to cause the film to conform to a surface of the reference part such that an adhesive side of the film faces outward from the reference part and a release side of the film conforms to and contacts the reference part;
after applying the vacuum and before removing the vacuum, positioning a plurality of composite plates over a plurality of flat portions of the reference part and adhering the plurality of composite plates to the adhesive side of the film over the plurality of flat portions of the reference part;
applying an adhesive material to fill in a plurality of gaps between the plurality of composite plates;
curing the adhesive material to form the outer mold line caul; and
removing the vacuum.

16. The method of claim 15, further comprising:
sizing a composite plate of the plurality of composite plates such that the composite plate overlaps an entirety of a corresponding flat portion when positioned over the corresponding flat portion.

17. The method of claim 15, further comprising:
sizing a composite plate of the plurality of composite plates such that the composite plate is offset from an edge of a corresponding flat portion or extends past the edge and hangs over a curved portion that is adjacent to the edge.

18. The method of claim 15, wherein curing the adhesive material comprises:
curing the adhesive material using at least one of air or heat.

19. The method of claim 15, wherein the adhesive material is an epoxy paste adhesive.

20. The method of claim 15, wherein:
the vacuum is removed after curing the adhesive material.

21. The method of claim 20, further comprising:
removing the outer mold line caul from the reference part.

22. A method comprising:
fabricating an outer mold line caul by the method of claim 14, and then fabricating a composite part using the outer mold line caul.

* * * * *